(12) United States Patent
Johnson, II

(10) Patent No.: US 7,172,231 B1
(45) Date of Patent: Feb. 6, 2007

(54) MOBILE CAMPING FACILITY AND METHOD FOR CONSTRUCTING SAME

(76) Inventor: Harry M. Johnson, II, 8209 St. Patrick St., North Richland Hills, TX (US) 76180

( * ) Notice: Subject to any disclaimer, the term of this patent is extended or adjusted under 35 U.S.C. 154(b) by 131 days.

(21) Appl. No.: 10/926,214

(22) Filed: Aug. 25, 2004

Related U.S. Application Data

(63) Continuation-in-part of application No. 10/909,579, filed on Aug. 2, 2004.

(51) Int. Cl.
*B60P 3/025* (2006.01)

(52) U.S. Cl. ............... 296/22; 296/24.36; 296/168

(58) Field of Classification Search .......... 296/22, 296/24.36, 156, 163, 168
See application file for complete search history.

(56) References Cited

U.S. PATENT DOCUMENTS

| | | | | |
|---|---|---|---|---|
| 1,962,454 A | * | 6/1934 | Meanor et al. ............. 296/22 |
| 1,964,805 A | * | 7/1934 | Barnes ..................... 296/22 |
| 1,979,549 A | * | 11/1934 | Huckel .................... 296/22 |
| D175,888 S | * | 10/1955 | Hunt ....................... 296/22 |
| 3,667,799 A | * | 6/1972 | Shryock ................... 296/22 |
| D225,520 S | | 12/1972 | Kathmann | |
| 4,270,319 A | * | 6/1981 | Spasojevic ................ 296/22 |
| 4,332,040 A | | 6/1982 | Palmer | |
| 4,454,613 A | | 6/1984 | Palmer | |
| 4,512,826 A | * | 4/1985 | Whang ................... 148/407 |
| 4,535,933 A | * | 8/1985 | Kuiper .................... 296/22 |
| 4,757,755 A | | 7/1988 | Sarten | |
| 4,842,316 A | | 6/1989 | Lerma et al. | |
| 5,031,602 A | | 7/1991 | Vick | |
| 5,277,489 A | * | 1/1994 | Hamm ..................... 366/2 |
| 5,383,703 A | | 1/1995 | Irvine, III | |
| 5,480,170 A | * | 1/1996 | Kaiser, II ................. 296/22 |
| 5,833,295 A | | 11/1998 | Farlow, Jr. | |
| 6,189,944 B1 | * | 2/2001 | Piche ...................... 296/22 |
| 6,250,211 B1 | | 6/2001 | Gongwer | |
| 6,349,715 B1 | | 2/2002 | McBroom | |
| 6,416,101 B1 | | 7/2002 | Bartch | |
| 6,431,628 B1 | * | 8/2002 | Bell, Jr. ................... 296/22 |
| 6,557,547 B1 | | 5/2003 | MacIntosh | |
| 2002/0180228 A1 | | 12/2002 | Poarch et al. | |

* cited by examiner

*Primary Examiner*—Lori L. Coletta
(74) *Attorney, Agent, or Firm*—Eric Karich

(57) ABSTRACT

A mobile camping facility is disclosed including a housing mounted over a top surface of a substantially rigid base plate, wherein the base plate is mounted on a bed of a trailer. The bed of the trailer is supported by a pair of wheels. The housing supports a countertop surface and includes a cover portion adapted for covering the countertop surface. A sink and a stove are operably mounted through the countertop surface. A fuel source is operably connected to the stove and separated from the stove by the countertop surface. A water source, mounted on either the base plate or on the trailer, is operably connected to the sink. A method for constructing a mobile camping facility is also described.

11 Claims, 7 Drawing Sheets

MOBILE CAMPING FACILITY AND METHOD FOR CONSTRUCTING SAME

CROSS-REFERENCE TO RELATED APPLICATIONS

This application for a utility patent is a continuation-in-part of a previously filed utility patent, now abandoned, having the application Ser. No. 10/909,579, filed on Aug. 2, 2004. The previous application is hereby incorporated by reference in its entirety.

STATEMENT REGARDING FEDERALLY SPONSORED RESEARCH

Not Applicable

BACKGROUND OF THE INVENTION

1. Field of the Invention

This invention relates generally to mobile facilities, and more particularly to mobile camping facilities.

2. Description of Related Art

The following describes the state of the art in this field:

R. S. Shryock, U.S. Pat. No. 3,667,799, describes a camper kitchen and utility trailer that includes a storage space for guns, fishing rods and the like. The trailer further includes a sink that is supplied with water from a tank, a burner, a refrigerator, and a portable shelter.

Palmer, U.S. Pat. No. 4,332,040 (and also U.S. Pat. No. 4,454,613), describe a self-contained, compact trailer that provides sanitary and electrical components, water and gas distribution systems with minimum weight, optimum balance and a maximum volume of water adapted to be stored therein. It also includes a frame having an axle and a tow bar adapted to be coupled to a towing vehicle, a multi-stage potable water storage and drain and waste water collection and isolation system. This system includes a potable water storage system, adapted to be filled by an exterior source, comprising tanks having a predetermined geometrical shape and balance over the wheels forming the axle of the trailer.

Palmer, U.S. Pat. No. 4,454,613, describes a self-contained, compact towable facility having sanitary and Farlow, Jr., U.S. Pat. No. 5,833,295, describes a lightweight mobile kitchen that has the capability to be transported to a remote food service site by a small prime mover and operated by a minimal crew. The kitchen has compartmentalized areas for sanitation, food preparation, grilling, convection baking, ovens, and warming. The kitchen is self contained and includes its own fuel, filtration system, potable water, fuel, electric lights, an automatic gas shutoff and a fire suppression system. The kitchen is mounted on a wheeled chassis and is moved as a closed wagon, then the sides and end are opened for cooking. Accessory flexible enclosure material is connected to the wagon sides to provide an enclosure for protection from the elements during service and consumption of food.

Lerma et al., U.S. Pat. No. 4,842,316, describes a picnic trailer that includes a propane tank operably connected to a burner, a picnic table, and a sink (although no water), all mounted on a wheeled rear frame. An elongated towbar extends forwardly from the rear frame and is connectable to a suitable towing vehicle. A vertical support frame structure interconnects the rear frame and a longitudinally intermediate portion of the towbar, and carries a collapsible, roofed picnic table structure. A rear end portion of the towbar, and a pair of diagonally oriented towing brace members, are pivotally connected to the longitudinally intermediate portion of the towbar and are releasably connectable to the rear frame for towing purposes. When the trailer is parked, and the picnic table and roof portions thereof set up for use, the brace members and the towbar rear end portion may be swung away from the rear frame.

McBroom, U.S. Pat. No. 6,349,715 B1, describes a mobile cart for cooking and cleaning purposes. The mobile cooking device includes a housing mounted on two pairs of wheels, a sink is positioned in the housing, a plurality of burners is positioned on the top wall of the housing, and a fuel supply fluidly coupled to each of the burners. A pair of attachment points enables the user to attach the cart to a water supply and sewer drain. The cart does not contain its own water supply, cannot provide hot water, and is not adapted to be towed behind a vehicle.

Gongwer, U.S. Pat. No. 6,250,211 B1, describes a barbecue mechanism that is adapted to be towed. A gear driven spit arm is located above the cooking area, and is movable from a rearward position over the cooking area outwardly by way of linkage arms, to a position proximate outer side of the lower casing member. In this manner, food to be cooked can be loaded on the spit arm for the cooking process. A multi-part cover is also included, which includes a fixed portion mounted to the lower casing member, and a pivotable portion which pivots relative to the fixed portion and defines an opening into which the spit arm rotates when it is in its fully forward position.

Irvine, III, U.S. Pat. No. 5,383,703, describes a modular trailer utilizing a small trailer body capable of being pulled by the average passenger automobile. The trailer's interior is provided such that it may be utilized in a completely open fashion for the transportation of large, bulky items, or alternatively may be utilized with the addition of removal modular walls, shelves and restraints in a wide variety of configurations which provide particularized storage spaces for small items or items requiring special restraint during transportation. The trailer is provided with fold-out accessories such as a picnic table and trailering ramps, all of which may be broken down and stored within the trailer with a relatively small loss of utility space in the event that the device is to be utilized in an empty mode.

MacIntosh, U.S. Pat. No. 6,557,547 B1, describes a portable cooking or barbequing apparatus that includes a front end with a tow hitch mechanism and ground engaging wheels mounted on opposite sides of the frame. A plurality of smaller housings, each containing a gas burner, are fixedly mounted in the main housing. A gas supply system provides fuel gas to the burners and a burner control system operates the gas burners and controls the flow of fuel gas to the burners. Similar devices are taught in Sarten, U.S. Pat. No. 4,757,755, Bartch, U.S. Pat. No. 6,416,101 B1, and Vick, U.S. Pat. No. 5,031,602

Poarch et al., US 2002/0180228 A1, describes an eating counter apparatus for mounting to a three or four-wheeled, motorized or pedal-powered vehicle. The apparatus may be used at least part of a mobile food vending eatery whereby to utilize the vehicle to provide an eating area for the patrons of the eatery. The eating counter apparatus also may mount a seating apparatus arranged to support seated patrons about the vehicle as they eat at the counter of the eatery vehicle.

Kathmann, U.S. Des. 225,520, describes a combined trailer and kitchen unit that includes, on its rear, a sink and burner for use in camping or the like.

SUMMARY OF THE INVENTION

A mobile camping facility is disclosed including a housing mounted over a top surface of a substantially rigid base plate, wherein the base plate is mounted on a bed of a trailer. The bed of the trailer is supported by a pair of wheels. The housing supports a countertop surface and includes a cover portion adapted for covering the countertop surface. A sink and a stove are operably mounted through the countertop surface. A fuel source is operably connected to the stove and separated from the stove by the countertop surface. A water source, mounted on either the base plate or on the trailer, is operably connected to the sink. A method for constructing a mobile camping facility is also described. Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
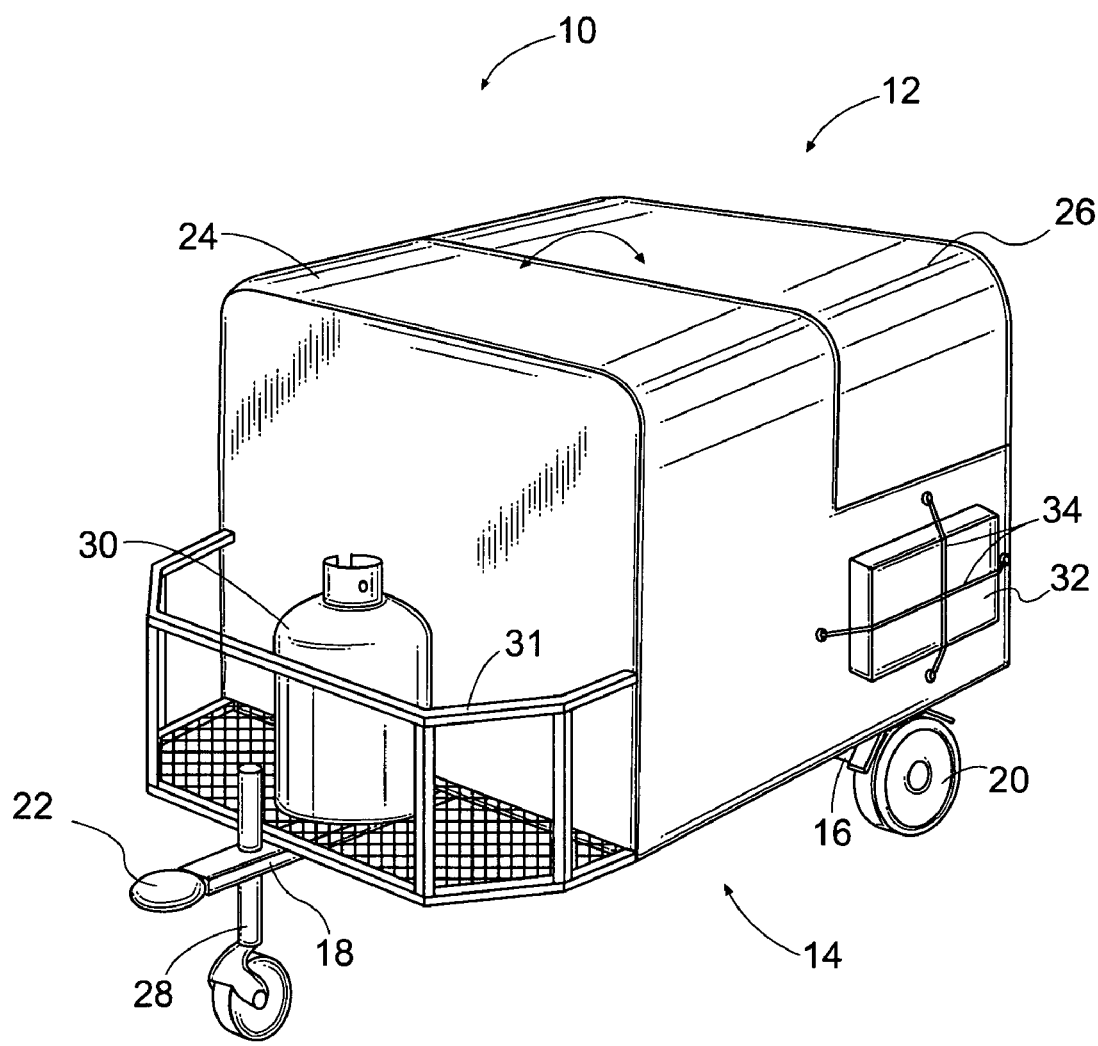
FIG. 1 is a perspective view of one embodiment of a mobile camping facility including a housing mounted over a top surface of a substantially rigid base plate, wherein the base plate is mounted on a bed of a trailer, and wherein the housing includes a cover portion hingedly attached to a main portion.

FIG. 1 is a perspective view of one embodiment of a mobile camping facility 10 including a housing 12 mounted over a top surface of a substantially rigid base plate, wherein the base plate is mounted on a bed of a trailer 14. The trailer 14 includes an axle 16 connected to a tow bar 18. A pair of wheels, including a wheel 20 shown in FIG. 1, are rotatably connected to opposite ends of the axle 16. The pair of wheels support the bed of the trailer 14 and the other components of the mobile camping facility 10. A coupler 22 connected to the end of tow bar 18 is adapted for removable attachment to a vehicle (e.g., a trailer hitch of car or truck) such that the vehicle can tow the mobile camping facility 10. The mobile camping facility 10 preferably weighs less that 450 pounds such that the mobile camping facility 10 can be towed by most automobiles.

In the embodiment of FIG. 1 the housing 12 includes a main portion 24 and a cover portion 26 hingedly attached to the main portion 24. In FIG. 1 the cover portion 26 is shown in a closed position. In the closed position, the cover portion 26 provides a protective cover for a countertop surface supported by the housing 12.

In the embodiment of FIG. 1 a swing away trailer jack 28 is connected to the tow bar 18 adjacent the coupler 22, and a propane tank 30 is mounted in a rack 31 mounted on top of the tow bar 18. The trailer jack 28 advantageously includes a small wheel to facilitate maneuvering of the mobile camping facility 10 by a user. A waste water collection container 32 is attached to a side of the housing 12 via a pair of cords 34. Alternatively, the waste water collection container 32 can be mounted on the rack 31, or in other locations as may be devised by one skilled in the art.

In the embodiment of FIG. 1, the trailer 14 is preferably a utility trailer with a substantially flat bed measuring about 40 inches in width (between the wheels) and approximately 48 inches in length (from front to rear). The bed may, for example, be made of plywood. Suitable trailer kits are commercially available, and the trailer 14 may be assembled from such a kit. As indicated in FIG. 1 the trailer 14 preferably includes fenders over the wheels. The trailer 14 preferably also includes a pair of safety chains adjacent the coupler, and approved lighting including running lights and turn signals.

The substantially rigid base plate, described in more detail below, is in general a rectangular plate (e.g., a sheet of plywood) having opposed top and bottom surfaces. The base plate is mounted on, and may be fixedly attached to, the bed of the trailer 14 such that the bottom surface of the base plate is in continuous contact with a top surface of the bed of the trailer 14.

Figure 2:
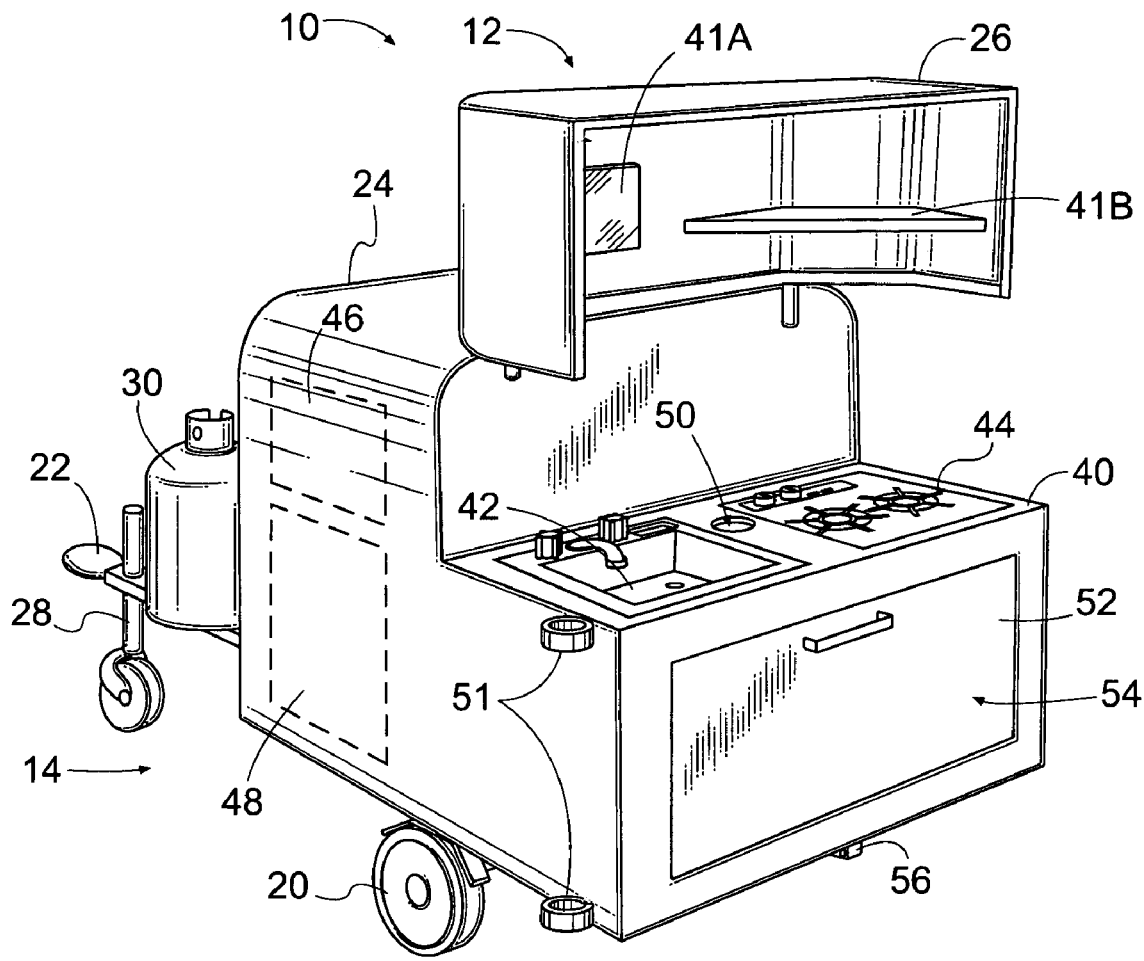
FIG. 2 is a perspective view of the mobile camping facility of FIG. 1 wherein the cover portion of the housing is shown in an open position revealing a countertop surface supported by the housing.

FIG. 2 is a perspective view of the mobile camping facility 10 of FIG. 1 wherein the cover portion 26 of the housing 12 is shown in an open position revealing the countertop surface, labeled 40 in FIG. 2, supported by the housing 12. In the embodiment of FIG. 2 a sink 42 is installed in one opening in the countertop surface 40, and a stove 44 is installed in another opening in the countertop surface 40. The propane tank 30 provides propane to the stove 44.

On the inside of the cover portion 26 is mounted a small mirror 41A and a shelf 41B for storage.

The portion of the countertop surface surrounding the sink 42 and the stove 44 is largely available for use during meal preparation. In addition, the countertop surface 40 also advantageously separates the stove 44 and the propane tank 30, helping to prevent an explosion and/or a fire in the event of a leak in a distribution system used to route propane from the propane tank 30 to the stove 44.

In the embodiment of FIG. 2 the mobile camping facility 10 includes a water storage tank (water tank) 46 for storing water is mounted within the housing 12. The water tank 46 provides water under pressure to a faucet of the sink 42. The water tank 46 may be, for example, pressurized by air stored under pressure in a bladder within the water tank 46. Alternately, water from the water tank 46 may be pressurized by a pump (e.g., an electric or manual pump). Further, the water tank 46 may include an expandable bladder for storing the water such that the water in the water tank 46 is maintained under pressure. It is noted that in other embodiments the water tank 46 may be mounted on the trailer 14 outside the housing 12.

In general, the waste water collection container 32 of FIG. 1 is adapted for collecting waste water from the sink 42. Prior to use of the sink 42, the waste water collection container 32 of FIG. 1 is positioned beneath the sink 42 and connected to a drain of the sink 42.

In the embodiment of FIG. 2 the mobile camping facility 10 also includes a water heater 48 for heating water from the water tank 46 to be delivered to a hot water control valve of the faucet the sink 42. The water heater 48 is preferably a propane water heater, and receives propane from the propane tank 30. Alternately, the water heater 48 may be an electric water heater, and may receive electrical power from a battery or an external source (e.g., a utility power connection or solar power panel). Further, the water heater 48 may be a storage tank of a solar hot water heating system.

In the embodiment of FIG. 2, the housing 12 has a rear door 52 providing access to a storage area 54 below the countertop surface 40. The countertop surface 40 may have an aperture 50 extending therethrough for receiving a rod or pole of an umbrella (shown in FIG. 3). When the umbrella pole is inserted into the aperture 50, one or more side surfaces about the aperture 50 support the pole in a substantially vertical orientation. In an alternative embodiment, the mobile camping facility 10 may include a pair of ring brackets 51, or similar structure, for supporting the umbrella in another manner. In other embodiments, the mobile camping facility 10 may have pull out/roll away tarps (not shown) for shade and cover.

In the embodiment of FIG. 2 the mobile camping facility 10 also includes a folding support leg 56. The support leg 56 is hingedly attached to a bottom portion of the trailer 14. When the mobile camping facility 10 is stationary, the support leg 56 may be extended downward to prevent the trailer 14 from tipping. When the support leg 56 is extended downward and the trailer jack 28 is operated such that the wheels of the trailer are lifted off the ground, the mobile camping facility 10 is prevented from rolling and is made stationary.

Figure 3:
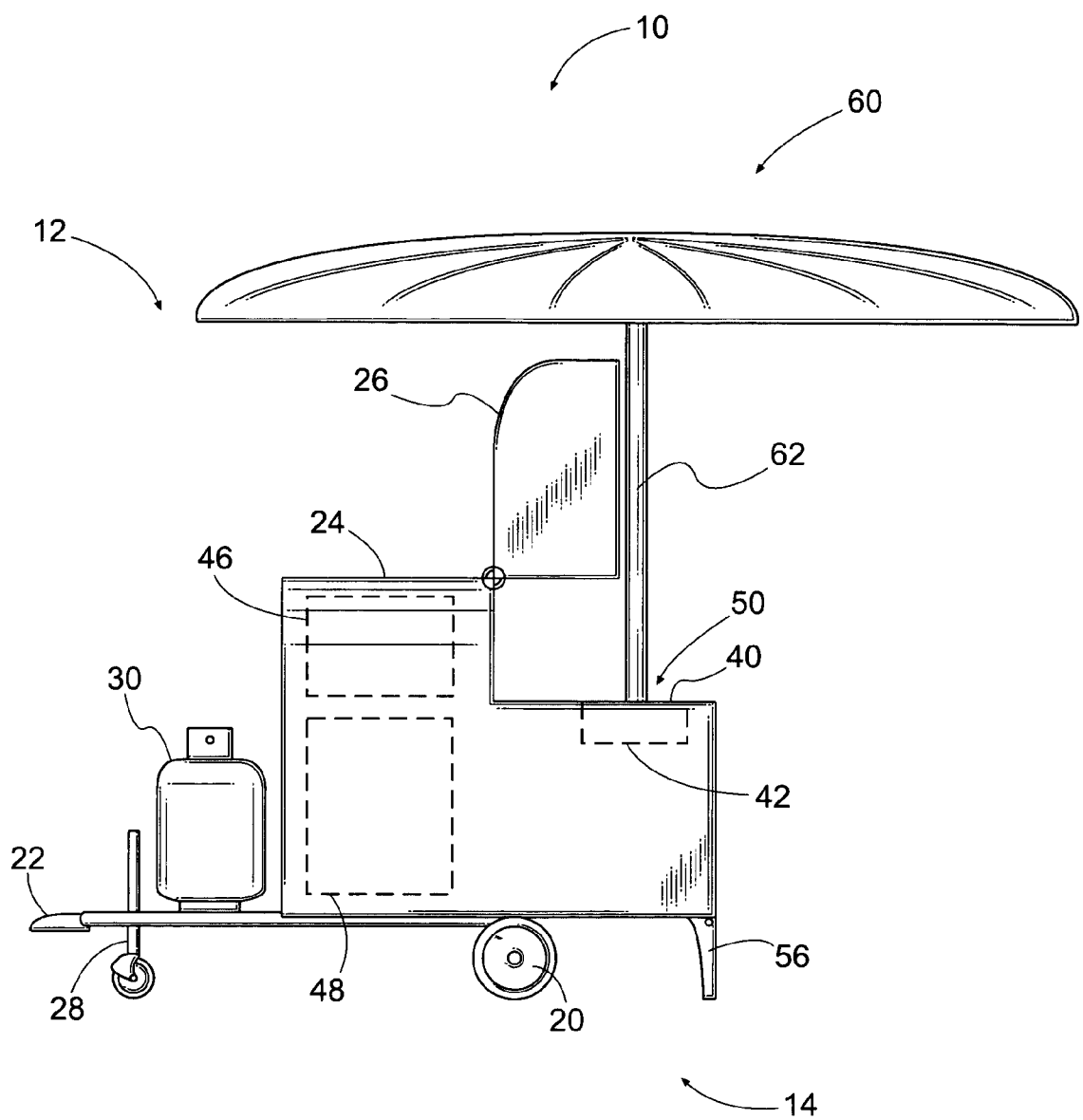
FIG. 3 is a left side elevation view of the mobile camping facility of FIG. 2 wherein a support leg is extended downward and a pole of an umbrella is installed in an aperture in the countertop surface.

FIG. 3 is a left side elevation view of the mobile camping facility 10 of FIG. 2 wherein the support leg 56 is extended downward and a pole 62 of an umbrella 60 is installed in the aperture 50 in the countertop surface 40. As described above, the side surfaces about the aperture 50 support the pole 62 in a substantially vertical orientation.

Figure 4:
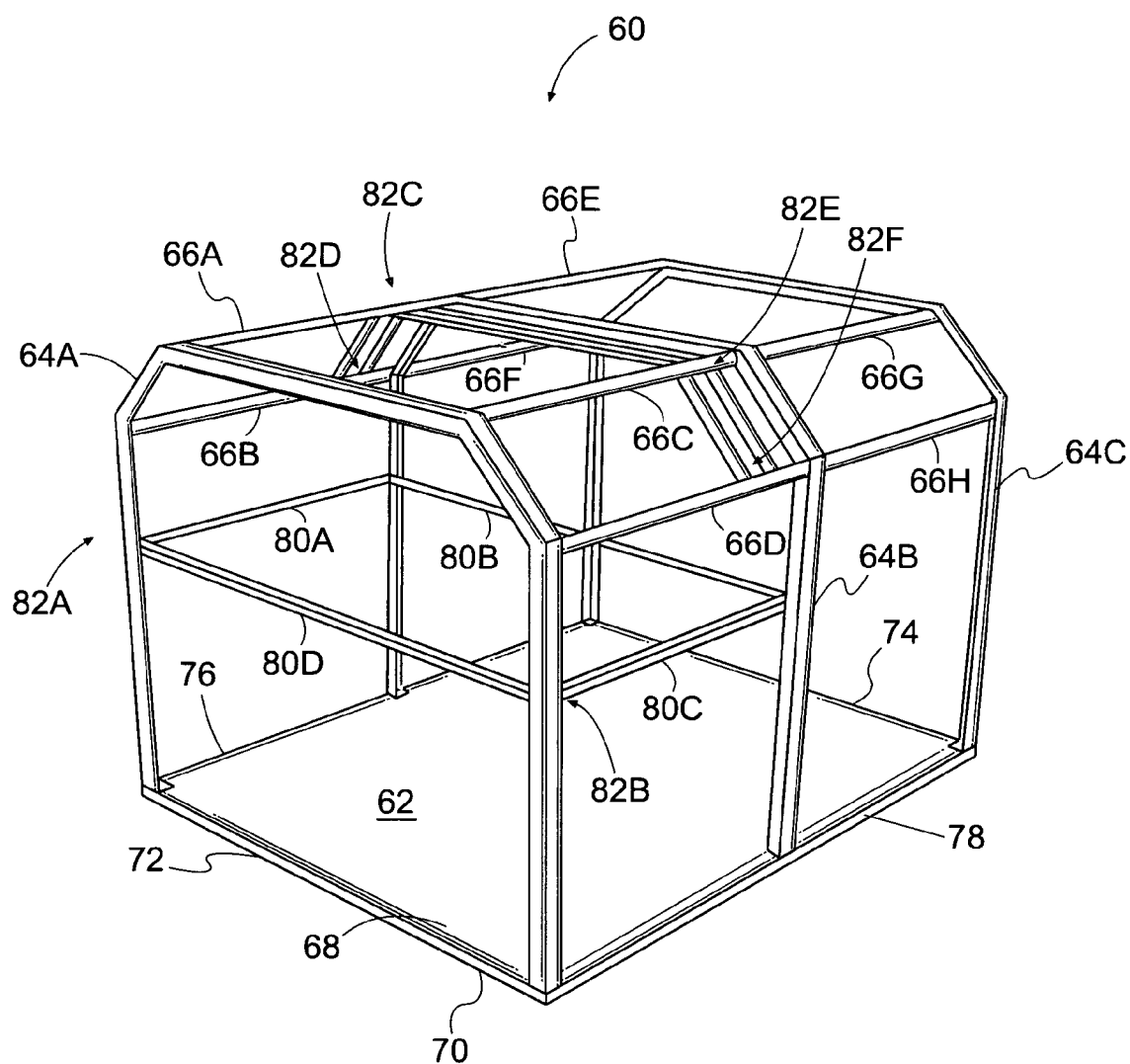
FIG. 4 is a perspective view of a frame of the housing of FIG. 1.

FIG. 4 is a perspective view of a frame 60 of the housing 12 of FIG. 1. The frame 60 is connected to the substantially rigid base plate, labeled 62 in FIG. 4. In the embodiment of FIG. 4, the frame 60 includes three arches 64A–64C mounted to the base plate 62 and connected by lateral connection ribs 66A–66H. In general, the arches 64A–64C and the lateral connection ribs 66A–66H are formed of a substantially rigid material. In one embodiment, the arches 64A–64C are fashioned from angle iron and the lateral connection ribs 66A–66H are cut lengths of steel flat bar.

In an alternative embodiment, the mobile camping facility 10 may be constructed from a single piece of fiberglass or other suitable material, according to processes known in the art.

As described above, the substantially rigid base plate 62 is in general a rectangular plate (e.g., a sheet of plywood). The base plate 62 has a top surface 68 and an opposed bottom surface 70, a front edge 72 and an opposed rear edge 74, and opposed side edges 76 and 78. The base plate 62 is mounted on, and may be fixedly attached to, the bed of the trailer 14 (FIGS. 1–3) such that the bottom surface 70 of the base plate 62 is in continuous contact with a top surface of the bed of the trailer 14.

FIG. 4 will now be used to describe one embodiment of a method for constructing the mobile camping facility of FIG. 1. The method involves providing the substantially rigid base plate 62 and the arches 64A–64C. Ends of the arch 64A are mounted on, and fixedly attached to (e.g., bolted to), the base plate 62 adjacent the front edge 72 such that the arch 64A extends over the top surface 68 of the base plate 62 as shown in FIG. 4. Ends of the arch 64B are mounted on, and fixedly attached to (e.g., bolted to), the base plate 62 between the front edge 72 and the rear edge 74 such that the arch 64B extends over the top surface 68 of the base plate 62. Similarly, ends of the arch 64C are mounted on, and fixedly attached to (e.g., bolted to), the base plate 62 adjacent the rear edge 74 such that the arch 64C extends over the top surface 68 of the base plate 62.

The lateral connection ribs 66A–66D are installed between the arches 64A and 64B, thereby connecting the arches 64A and 64B. The lateral connection ribs 66E–66H are installed (e.g., welded) between the arches 64B and 64C, thereby connecting the arches 64B and 64C. Countertop support braces 80A–80D are installed (e.g., welded) between the arches 64A and 64B, further connecting the arches 64A and 64B. Pairs of additional support members are installed (e.g., welded) between the lateral connection ribs 66A and 66B, between the lateral connection ribs 66A and 66C, and between the lateral connection ribs 66C and 66D as shown in FIG. 4.

The frame 60 is cut at several locations, thereby separating a frame of the cover portion 26 of the housing 12 of FIG. 1 from a frame of the main portion 24 of the housing 12 of FIG. 1. The arch 64A is cut at locations 82A and 82B above the countertop support brace 80D. The lateral connection ribs 66A–66C are cut at locations 82C–82F, respectively, between the additional support members. As a result, the frame of the cover portion 26 includes a top portion of the arch 64A and portions of the lateral connection ribs 66A–66D. A remaining portion of the frame 60 forms the frame of the main portion 24 of the housing 12.

A first hinge is attached between the portions of the lateral connection rib 66A separated by the cutting, and a second hinge is installed between the portions of the lateral connection rib 66C separated by the cutting. As a result, the frame of the cover portion 26 is hingedly attached to the frame of the main portion 24 of the housing 12 (FIG. 1). The cover portion 26 may also include pneumatic cylinders (not shown) to assist in lifting the cover portion 26.

The countertop surface 40 of FIGS. 2 and 3 is mounted on and attached to the countertop support braces 80A–80D. A sheet material (e.g., polyvinyl chloride or aluminum sheeting) is fastened over (e.g., riveted to) an outer portion of the frame 60 forming an outer skin of the housing 12 of FIG. 1. The base plate 62 is mounted on, and may be fixedly attached to, the bed of the trailer 14 of FIG. 1. The frame 60 of the housing 12 is preferably fastened (e.g., welded) to a chassis of the trailer 14.

The water tank 46 and the water heater 48 are installed in the housing 12 (see FIG. 2). The distribution system used to route water from the water tank 46 (FIGS. 2–3) to the sink 42 (FIGS. 2 and 3) is installed.

A mounting frame for the propane tank 30 (FIG. 1) is fabricated and fastened (e.g., welded) to the tow bar 18 of the trailer 14 (FIG. 1). The distribution system used to route propane from the propane tank 30 (FIGS. 1–3) to the stove 44 (FIG. 2) is installed.

The sink 42 (FIGS. 2 and 3) and the stove 44 (FIG. 2) are mounted in corresponding openings in the countertop surface 40. The sink 42 is connected to the water distribution system, and the stove 44 is connected to the propane distribution system.

Figure 5:
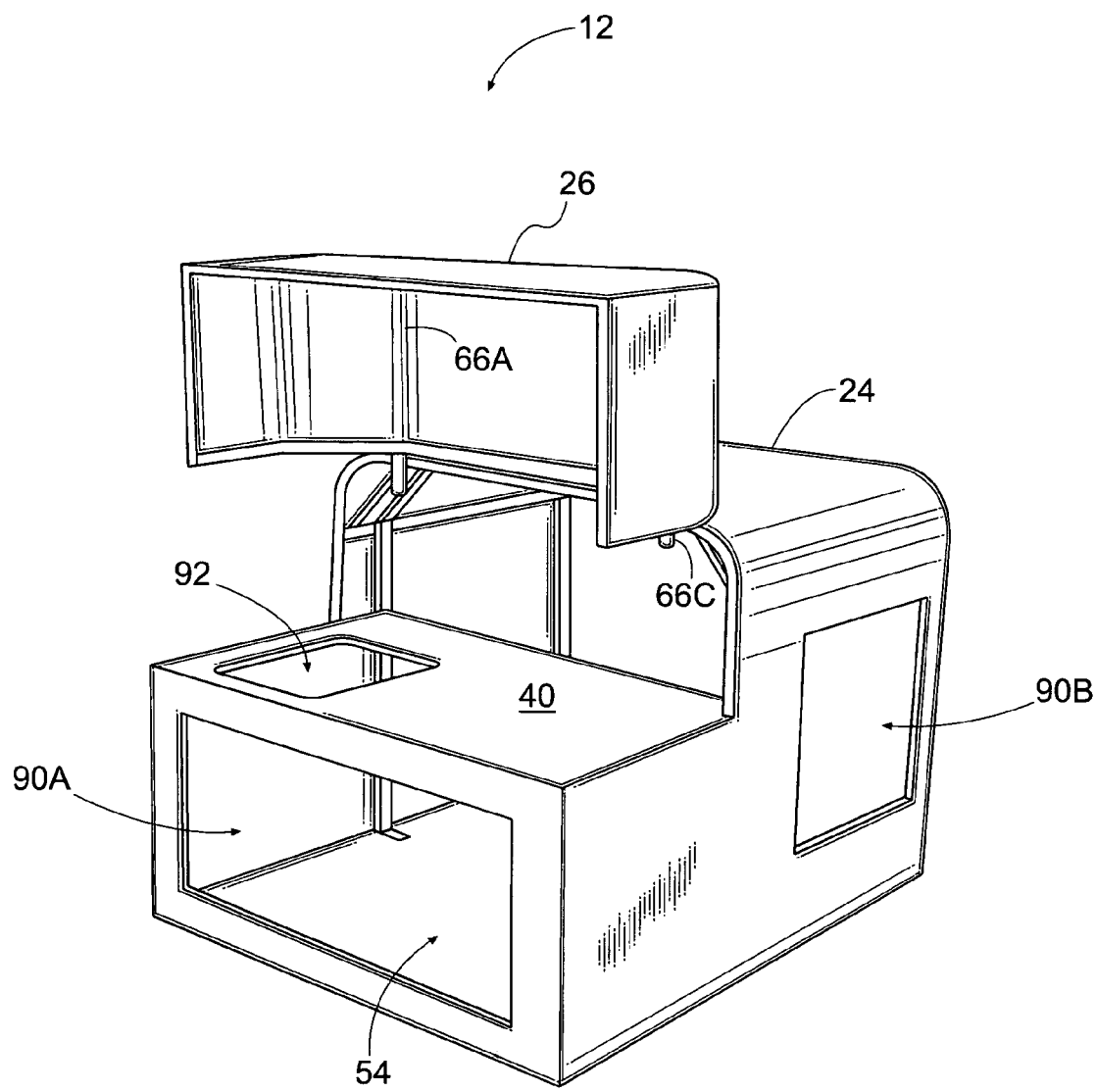
FIG. 5 is a perspective view of the frame of FIG. 4 following attaching of hinges between portions of lateral connection ribs separated by cutting, covering of the frame with a sheet material, attaching of the countertop surface to countertop support braces, and forming of openings in an outer skin of the housing.

FIG. 5 is a perspective view of the frame 60 of FIG. 4 following the attaching of the hinges between the portions of the lateral connection ribs 66A and 66C separated by the cutting, the covering of the frame 60 with the sheet material, the attaching of the countertop surface 40 to the countertop support braces, and the forming of openings 90A and 90B in the outer skin of the housing 12. In FIG. 5 the countertop surface 40 has only one opening 92 (for receiving the sink 42 of FIGS. 2 and 3). The opening 90A is for the door 52 of FIG. 2 that provides access to the storage area 54 below the countertop surface 40. The opening 90B is for another door that provides access to a second storage area adjacent the water tank 46 and the water heater 48 (see FIGS. 2 and 3). A refrigerator may optionally be installed in this second storage area.

Figure 6:
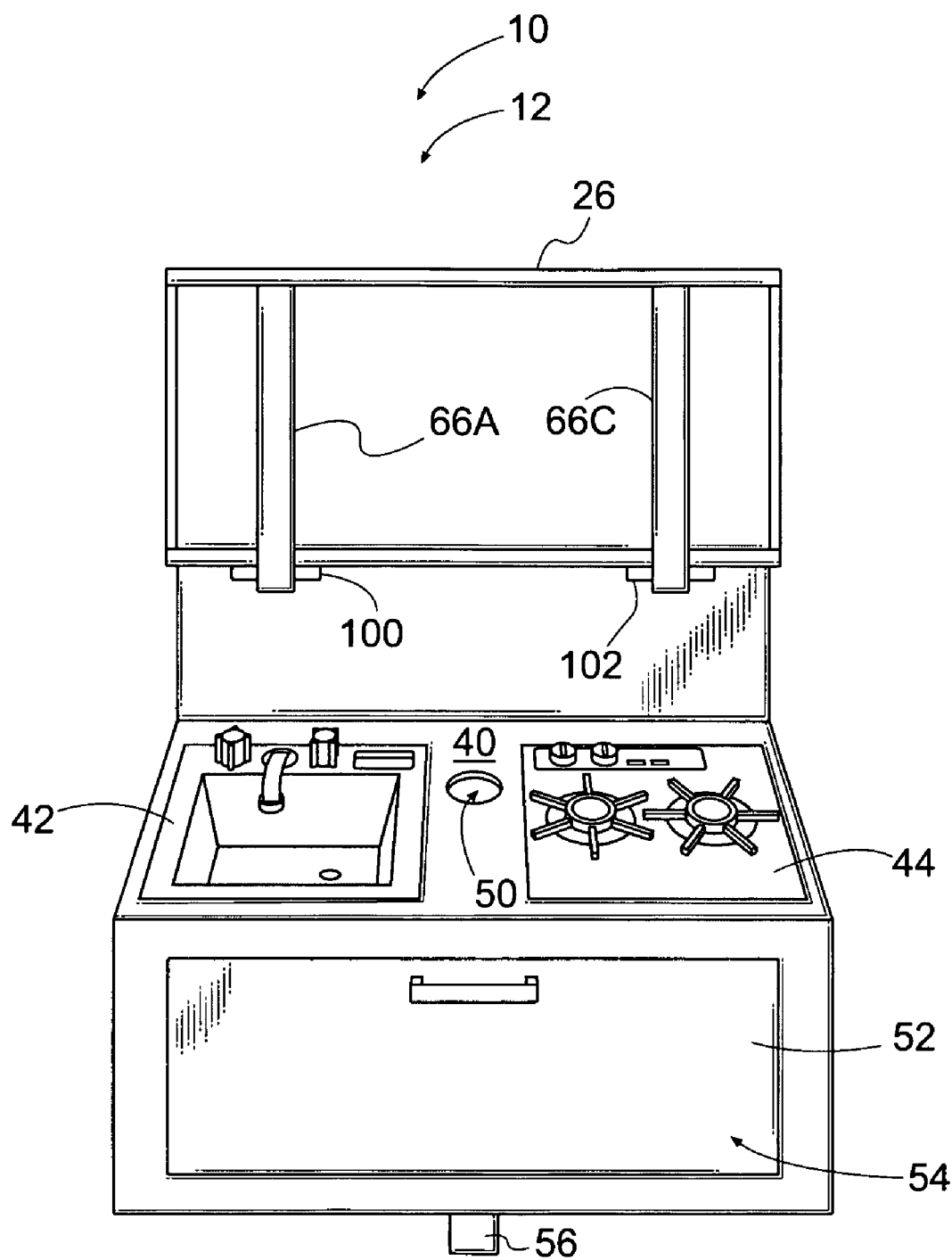
FIG. 6 is a rear perspective view of the mobile camping facility of FIG. 1 wherein the cover portion of the housing is in the open position.

FIG. 6 is a rear perspective view of the mobile camping facility 10 of FIG. 1 wherein the cover portion 26 of the housing 12 is in the open position. A hinge 100 connects the cut portions of the lateral connection rib 66A, and a hinge 102 connects the cut portions of the lateral connection rib 66C. The sink 42 and the stove 44 are installed in corresponding openings in the countertop surface 40.

As described above, the aperture 50 in the countertop surface 40 is dimensioned to receive a rod or pole of an umbrella. When the umbrella pole is inserted into the aperture 50, one or more side surfaces about the aperture 50 support the pole in a substantially vertical orientation. The rear door 52 of the 12 provides access to the storage area 54 below the countertop surface 40. The folding support leg 56 is hingedly attached to the bottom portion of the trailer 14. When the mobile camping facility 10 is stationary, the support leg 56 may be extended downward to prevent the trailer 14 from tipping.

Figure 7:
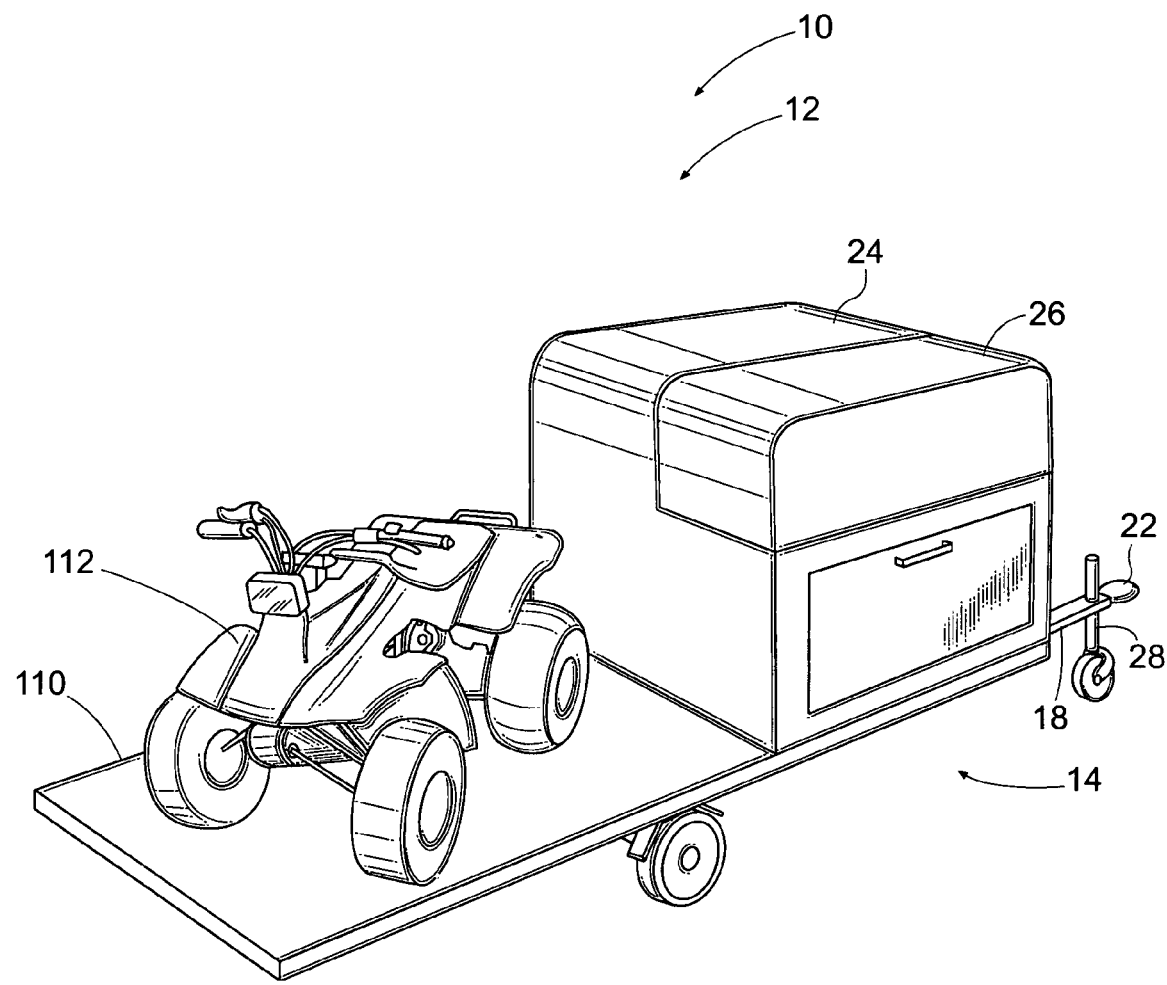
FIG. 7 is a perspective view of a second embodiment of the mobile camping facility of FIG. 1 wherein the housing occupies only a portion of the bed of the trailer.

FIG. 7 is a perspective view of a second embodiment of the mobile camping facility 10 of FIG. 1 wherein the housing 12 occupies only a portion of the bed, labeled 110 in FIG. 7, of the trailer 14. In the embodiment of FIG. 7 the housing 12 is positioned on a forward portion of the bed 110, and the cover portion 26 of the housing 12 is oriented toward a side of the bed 110 for easy access. A rear portion of the bed 110 is reserved for other equipment such as an all terrain vehicle 112 as shown in FIG. 7, or any other equipment that the user find necessary.

Other embodiments of the mobile camping facility 10 are possible and contemplated. For example, a rollout canopy may be a be attached to the cover portion 26 (see FIGS. 1–3 and 5–6) to provide a covered area adjacent the countertop surface 40 for meal preparation. Further, a heating/air conditioning unit may be installed in the housing 12 to provide conditioned air to a nearby sitting and/or sleeping area such as a tent. The heating/air-conditioning unit may use propane from the propane tank 30 of FIGS. 1–3, and would expectedly receive electrical power from a battery or other supply of electrical power.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A mobile camping facility comprising:
    a trailer comprising a bed supported by a pair of wheels;
    a substantially rigid base plate mounted on the bed of the trailer;
    a countertop surface;
    a housing mounted over a top surface of the base plate, wherein the housing comprises a main portion and a cover portion, and wherein the main portion is adapted to support the countertop surface, and wherein the cover portion is hingedly attached to the main portion and adapted for covering the countertop surface;
    a stove operably mounted through the countertop surface;
    a fuel source operably connected to the stove and separated from the stove by the countertop surface;
    a sink operably mounted through the countertop surface;
    a water source mounted on the base plate or on the trailer and operably connected to the sink; and
    wherein the base plate comprises a bottom surface opposite the top surface, opposed front and rear edges, and a pair of opposed side edges.

2. The mobile camping facility of claim 1 wherein the housing comprises a frame including a plurality of arches each fixedly attached to the side edges of the base plate and extending over the top surface of the base plate, and wherein the arches are interconnected by a plurality of lateral connection ribs.

3. The mobile camping facility of claim 2 wherein the cover portion comprises a frame including a top portion of at least one of the arches.

4. A method for constructing a mobile camping facility, the method comprising the steps of:
    providing a trailer comprising a bed supported by a pair of wheels;
    providing a substantially rigid base plate having opposed top and bottom surfaces, opposed front and rear edges, and a pair of opposed side edges;
    providing a first arch, a second arch, and a third arch, wherein the first, second, and third arches are formed of a rigid material;
    mounting the first arch on the base plate adjacent the front edge such that the first arch extends over the top surface;
    mounting the second arch on the base plate between the front edge and the rear edge such that the second arch extends over the top surface;
    mounting the third arch on the base plate adjacent the rear edge such that the third arch extends over the top surface;
    connecting the first and second arches via a first plurality of lateral connection ribs;
    connecting the second and third arches via a second plurality of lateral connection ribs;
    connecting the first and second arches via a plurality of countertop support braces;
    cutting the first arch and the first plurality of lateral connection ribs to separate a frame of a cover portion from a frame of a main portion, wherein the frame of the cover portion comprises a top portion of the first arch and portions of the first plurality of lateral connection ribs;
    hingedly attaching the frame of the cover portion to the frame of the main portion;
    mounting a countertop surface on the countertop support braces; and
    mounting the base plate on the bed of the trailer such that the mobile camping facility is supported for movement upon the pair of wheels.

5. The method of claim 4 wherein the hingedly attaching step comprises: hingedly attaching portions of at least two of the first plurality of lateral connection ribs separated by the cutting to one another.

6. The method of claim 4 further comprising the step of operably mounting a stove through the countertop surface.

7. The method of claim 4 further comprising the step of operably connecting the stove to a fuel source, wherein the fuel source is separated from the stove by the countertop surface.

8. The method of claim 4 further comprising the step of operably mounting a sink through the countertop surface.

9. The method of claim 4 further comprising the step of operably connecting the sink to a water source mounted either on the base plate or on the trailer.

10. A mobile camping facility comprising:
a trailer comprising a bed supported by a pair of wheels;
a substantially rigid base plate mounted on the bed of the trailer;
a countertop surface;
a housing mounted over a top surface of the base plate, wherein the housing comprises a main portion and a cover portion, and wherein the main portion is adapted to support the countertop surface, and wherein the cover portion is hingedly attached to the main portion and adapted for covering the countertop surface;
a stove operably mounted through the countertop surface;
a fuel source operably connected to the stove and separated from the stove by the countertop surface;
a sink operably mounted through the countertop surface;
a water source mounted on the base plate or on the trailer and operably connected to the sink;
a water heater operably connected to the water source and the fuel source and configured to heat water from the water source;
wherein the trailer further comprises a tow bar, and wherein the tow bar extends from a front portion of the mobile camping facility, and wherein the pair of wheels are positioned under opposite sides of the mobile camping facility, and wherein the countertop surface is positioned in a rear portion of the mobile camping facility away from the tow bar and the pair of wheels.

11. The mobile camping facility of claim 10, wherein the cover portion of the housing is positioned in the rear portion of the mobile camping facility, and opens toward the front portion of the mobile camping facility.

* * * * *